(12) United States Patent
Gruber et al.

(10) Patent No.: US 8,860,721 B2
(45) Date of Patent: Oct. 14, 2014

(54) METHOD AND APPARATUS FOR PROCESSING PIXEL DEPTH INFORMATION

(75) Inventors: Andrew E. Gruber, Arlington, MA (US); Christopher J. Brennan, Holden, MA (US)

(73) Assignee: ATI Technologies ULC, Markham, Ontario (CA)

( * ) Notice: Subject to any disclaimer, the term of this patent is extended or adjusted under 35 U.S.C. 154(b) by 2676 days.

(21) Appl. No.: 11/277,641

(22) Filed: Mar. 28, 2006

(65) Prior Publication Data
US 2007/0236495 A1    Oct. 11, 2007

(51) Int. Cl.
*G06T 15/40* (2011.01)

(52) U.S. Cl.
CPC .................................... *G06T 15/405* (2013.01)
USPC .......................................... 345/422; 345/522

(58) Field of Classification Search
None
See application file for complete search history.

(56) References Cited

U.S. PATENT DOCUMENTS 6,734,861 B1 *   5/2004   Van Dyke et al. ............ 345/506

\* cited by examiner

*Primary Examiner* — Ulka Chauhan
*Assistant Examiner* — Robert Bader
(74) *Attorney, Agent, or Firm* — Faegre Baker Daniels LLP

(57) ABSTRACT

An apparatus and method for processing pixel depth information eliminates stalling of data in a pixel pipeline, by performing late Z processing for one or more pixels currently in the pixel pipeline and early Z processing for one or more pixels entering the pixel pipeline. The apparatus and method also includes determining whether the late Z processing for the one or more pixels currently in the pixel pipeline has been completed. The apparatus and method also includes solely performing early Z processing for subsequent pixels entering the pixel pipeline responsive to determining that late Z processing for the one or more pixels currently in the pixel pipeline has been completed. The methods and apparatus, facilitates concurrent processing of early and late Z data to avoid flushing portions of the pixel pipeline.

17 Claims, 4 Drawing Sheets

METHOD AND APPARATUS FOR PROCESSING PIXEL DEPTH INFORMATION

BACKGROUND OF THE INVENTION

The present disclosure relates to methods and apparatus for processing pixel depth information and, in particular, to eliminating pixel pipeline delays due to processing depth or Z data.

In conventional graphics processing systems, in order to save processing resources, pixel depth or Z data may be tested early in order to determine whether or not the pixel should be rendered in a particular frame (termed "early Z"). There are situations, however, where early testing of the Z depth cannot be performed such as, when the outcome or result of a particular processing of the pixel data is required before a determination of whether or not a pixel having a particular Z depth component should be written to a Z frame buffer. Particular examples of such processing include, but are not limited to, alpha testing and pixel kill conditions. Pixel kill conditions can occur, for example, to provide special visual effects. A pixel can be killed in a pipeline when the pixel should not be present in the rendered scene. Such a case might be encountered in a scene with trees, for example, in which pixels associated with leaves should be rendered, but pixels associated with the space between leaves should not be rendered, leaving the background to show through. Alpha testing is the process by which a pixel an be killed if a pixel value is beyond a threshold.

As a result of situations where early Z processing cannot be carried out, the Z processing stage (i.e., logic) becomes modal where the stage conditionally decides whether to perform early Z or late Z testing. Late Z testing occurs after a pixel has been produced by the pipeline. In conventional graphics processing systems, however, since there is typically only one set of Z processing logic (i.e. one Z processing stage), conventional systems must flush the pipeline prior to switching from late Z to early Z testing with a resultant loss in performance due to having to wait for all of the late Z pixels to be processed prior to the Z processing stage entering early Z processing mode. Also early Z processing typically needs to maintain pixel processing ordering rules and thus might need to use the Z results from the late Z pixels if both are for the same display screen position.

Accordingly, a need exists for a method and apparatus that may process early and late Z depth values at the same time in order to avoid having to drain the pipeline.

BRIEF DESCRIPTION OF THE DRAWINGS

The invention will be more readily understood in view of the following description when accompanied by the below figures and wherein like reference numerals represent like elements.

DETAILED DESCRIPTION OF THE PRESENT EMBODIMENTS

Briefly stated, an apparatus and method performs late Z processing for one or more pixels currently in the pixel pipeline and early Z processing for one or more pixels entering the pixel pipeline to, for example, eliminate stalling of an associated pipeline. The apparatus and method, in response to having to change from performing late Z processing on a pixel to performing early Z processing on another pixel, performs late Z processing for one or more pixels currently in the pixel pipeline and performs early Z processing for one or more pixels entering the pixel pipeline without flushing any of the pixels from the pipeline. In one embodiment, the apparatus and method includes determining whether or not the late Z processing for the one or more pixels currently in the pixel pipeline has been completed. The apparatus and method also includes solely performing early Z processing for subsequent pixels entering the pixel pipeline, responsive to determining that late Z processing for the one or more pixels currently in the pixel pipeline has been completed. The disclosed method and apparatus, when switching modes from a late Z processing to early Z processing, in particular, affords dual processing of both early and late Z data to avoid flushing portions of the pixel pipeline. Other advantages will be recognized by one of ordinary skill in the art.

Figure 1:
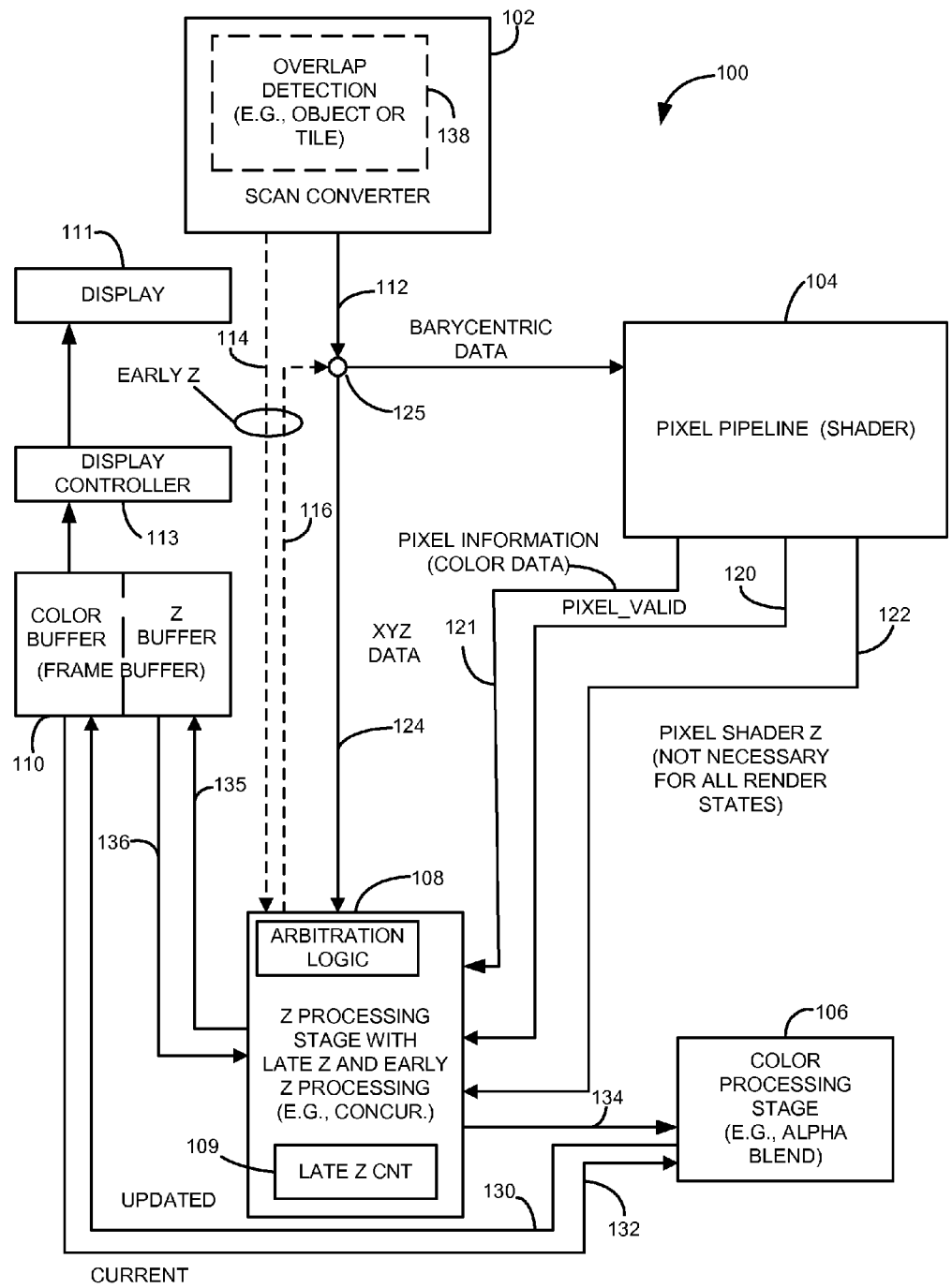
FIG. 1 illustrates an example of a graphics processing system according to the present disclosure.

FIG. 1 illustrates a portion of an apparatus that employs a graphics processing circuit 100 that may be found, for example, in a graphics processor chip or any other suitable integrated circuit that employs graphics processing and that may be incorporated as part of a device (apparatus) such as but not limited to handheld devices, set top boxes, computers, cameras, printers or any suitable device. In this example, the graphics processing circuit 100 includes a scan converter 102, a pixel pipeline 104, a color processing stage 106 and a Z processing stage 108 with concurrent late Z and early Z processing (also referred to as Z processing logic). In addition, the apparatus may include a frame buffer 110 which may be on-chip with the graphics processing circuit 110 or off-chip from the graphics processing circuit 110, and is operatively coupled to the Z processing stage 108. The frame buffer 110 may store Z values in a Z buffer and also store pixel information used for the color processing stage 106 to output pixels for display on a suitable display screen 111 using a suitable display controller 113, as known in the art. The graphics processing circuit 100 may be employed in a handheld device that includes a display such as a telephone, camera, printer, a non-handheld device such as, but not limited to, a laptop computer, desktop computer, set top box, cable card, or any other suitable device that employs graphics processing. As further described in more detail with respect to FIGS. 2-4, the Z processing stage 108 concurrently performs late Z processing for one or more pixels currently in pixel pipeline 104 and early Z processing for one or more pixels entering the pixel pipeline 104. The Z processing stage 108 switches between early and late Z processing for different pixels currently in the pixel pipeline. The scan converter 102 produces per pixel information as known in the art and in this example provides barycentric pixel data corresponding to pixels associated with a primitive or object to be rendered for the pixel pipeline 104 and corresponding x,y,z pixel information 124 for the Z processing stage 108 with concurrent late Z and early Z processing. However, any suitable coordinate space may be used. The barycentric data 112 is provided to the pixel pipeline 104 through gating logic 125 when, for example, early Z processing indicates that the pixel should be processed and not discarded due to its Z value.

In operation, the scan converter 102 knows if early or late Z processing should be performed on a given pixel. For example, a software driver executing on a host processor may provide information to the scan converter 102 indicating whether a given pixel or group of pixels is to undergo early or late Z processing. Alternatively, the scan converter 102 may monitor registers or other hardware portions of a graphics processing circuit, as known in the art, to determine whether a pixel or group of pixels should undergo early or late Z processing. If early Z processing for a given pixel is to be performed, the scan converter 102 provides the x,y,z data 114 for the pixel to the Z processing stage 108 with concurrent late Z and early Z processing via a suitable communication path. The Z processing stage 108 with concurrent late Z and early Z processing performs an early Z test on the pixel and returns data 116 representing the result of the early Z test to control the gating logic 125 to pass the corresponding barycentric pixel data for the pixel to the pixel pipeline 104 if the early Z test indicated that the pixel should be processed. The Z processing stage 108 with concurrent early and late Z processing processes pixels that undergo early Z processing while continuing to perform late Z processing on pixels that were previously submitted to the pixel pipeline.

The Z processing stage 108 includes arbitration logic that selects whether (at any given time) to process an 'Early Z' pixel directly from the scan converter or a 'late Z' pixel from the shader pipe. Any suitable method may be used, such as by giving priority to 'late Z' pixels. CONCURRENT.

For pixels that require late Z processing (those that are Z processed after they pass through the pixel pipeline), the scan converter passes corresponding x,y,z data 124 to the Z processing stage 108 with concurrent late Z and early Z processing to perform late Z testing on pixels in already in the pipeline. Resulting z values 135 from Z testing are stored in the Z buffer. Comparison of current Z values 136 stored in the Z buffer with the Z values of new pixels from the scan converter is performed, as known in the art, by the Z processing stage 108 with concurrent late Z and early Z processing. As shown, the scan converter 102 also includes overlap detection logic 138 as further described with reference to FIG. 4, that determines whether pixels overlap in screen space. If so, corresponding early Z pixels are marked as late Z pixels.

The pixel pipeline 104 may be implemented, for example, as a programmable shader and provides data 120 representing whether a pixel in the pipeline is valid (not killed) as well as pixel shader Z data 122 indicating a Z value to override the Z value provided by the scan converter, as known in the art. This information is provided to the Z processing stage 108 with concurrent late Z and early Z processing. The Z processing stage 108 with concurrent late Z and early Z processing uses the data 120 to determine whether to perform late Z processing on a given pixel or whether to avoid late Z processing since the pixel is not valid. The Z processing stage 108 with concurrent late Z and early Z processing uses the data 122 as the actual Z value for a given pixel to determine whether to update the value in the Z buffer as known in the art. The pixel pipeline 104 also produces pixel information 121 (e.g., color data) as known in the art which may be provided to the Z processing stage 108 with concurrent late Z and early Z testing. In another embodiment, if desired, the pixel pipeline 104 may also indicate whether a pixel was an "early Z" or "late Z pixel". Alternatively, this information may be determined by the Z processing state 108 or other logic based on a late Z counter, or in any suitable manner.

The color processing stage 106 is logic, as known in the art, that produces updated pixel color values 130, such as by performing alpha blending, after processing current pixel color values 132 and is operatively coupled to the frame buffer 110 to store and retrieve this information as known in the art. In addition, the color processing stage 106 is also operatively coupled to Z processing stage 108 with concurrent late Z and early Z processing and receives pixel color data 134 therefrom if the late Z pixel was not killed, as known in the art.

The Z processing stage 108 with concurrent late Z and early Z processing may include a late Z counter 109 to keep track of the number of pixels in the pipeline that require late Z processing while the pixel pipeline 104 may be receiving either early or late Z pixels (although it can only receive late Z pixels if the pixels "matched" in screen space as described above). The Z processing stage 108 with concurrent late Z and early Z processing is modal logic that may switch between early and concurrent late and early Z processing modes.

Figure 2:
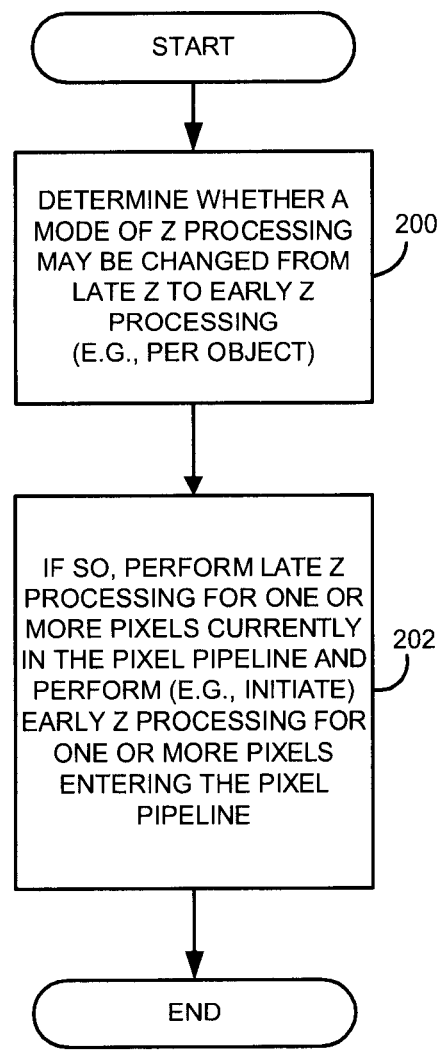
FIG. 2 is a flow chart illustrating one example of a method for eliminating stalling of data in a pixel pipeline in accordance with the invention.

FIG. 2 illustrates one example of a method for processing pixel depth information. The method may be carried out, by way of example, in part by a host processor executing a suitable software driver and by the Z processing stage 108 with concurrent late Z and early Z processing 108, or by any other suitable logic or any combination of suitable logic and may also be carried out by a processing unit that is suitably programmed with executable instructions that may be stored in memory that, when executed by the processing unit such as a CPU, DSP, or any other suitable processor or group of processors, operate as described herein.

As shown in block 200, the method optionally includes determining whether a mode of Z processing may be changed from late Z processing to early Z processing. A determination is made as to whether or not a different mode of Z processing in the Z processing stage 108 with concurrent late Z and early Z processing may be activated. The determination as to whether a mode of Z processing may be changed from late Z to early Z processing may be carried out by any suitable structure and in this embodiment is carried out by a software driver executing on a host processing device, such as a coprocessor to a graphics processor (i.e., that contains the pixel pipeline). The driver may be stored in system memory or any other suitable memory as known in the art. The coprocessor, in this particular example, determines whether a mode of Z processing for the Z processing stage 108 with concurrent late Z and early Z processing can be changed from late Z processing to early Z processing by analyzing render states associated with the pixel processing. For example, if an alpha test is enabled for an object, pixel early Z testing can be bypassed since a late Z test would be required to facilitate an alpha blend process. As another example, if shader instructions that were to be executed included pixel kill instructions then early Z processing would not be useful since the shader needs to be run to determine the kill/no kill status. If (mistakenly) early Z is done, then the Z buffer will be set as if the pixel is never killed.

As shown in block 202, if the determination is that the Z processing may be changed from late Z processing to early Z processing, the Z processing stage 108 performs late Z processing for one or more pixels currently in the pixel pipeline and performs (e.g., initiates) early Z processing for one or more pixels entering the pixel pipeline. This is done without flushing the pixel pipeline. For example, for many applications, the pixels may be processed out of order such that early Z pixels can be processed even if a late Z pixel is processed at a subsequent time. This may be true because the depth or Z value is typically used to provide depth ordering, independent of primitive vertice submission ordering in the pixel pipeline.

However, this sharing approach may not be optimum for certain conditions. For example, it will be recognized that some software applications depend on the order of object submittal to a pipeline and require that in the case that two pixels have the same Z value and the same screen location, the end color result reflects the second pixel submitted to the pipeline.

When such conditions are not necessary, the Z processing stage 108 is shared to Z process both late Z pixels and early Z pixels at the same time. The counter 109 is updated to keep track of the number of late Z pixels in the pipeline to enable the Z processing stage 108 to switch out of the sharing mode and into full performance mode which processes early Z pixels when the counter 109 reaches a 0 (or other desired value) and no flushing of the pixel pipeline is necessary.

Figure 3:
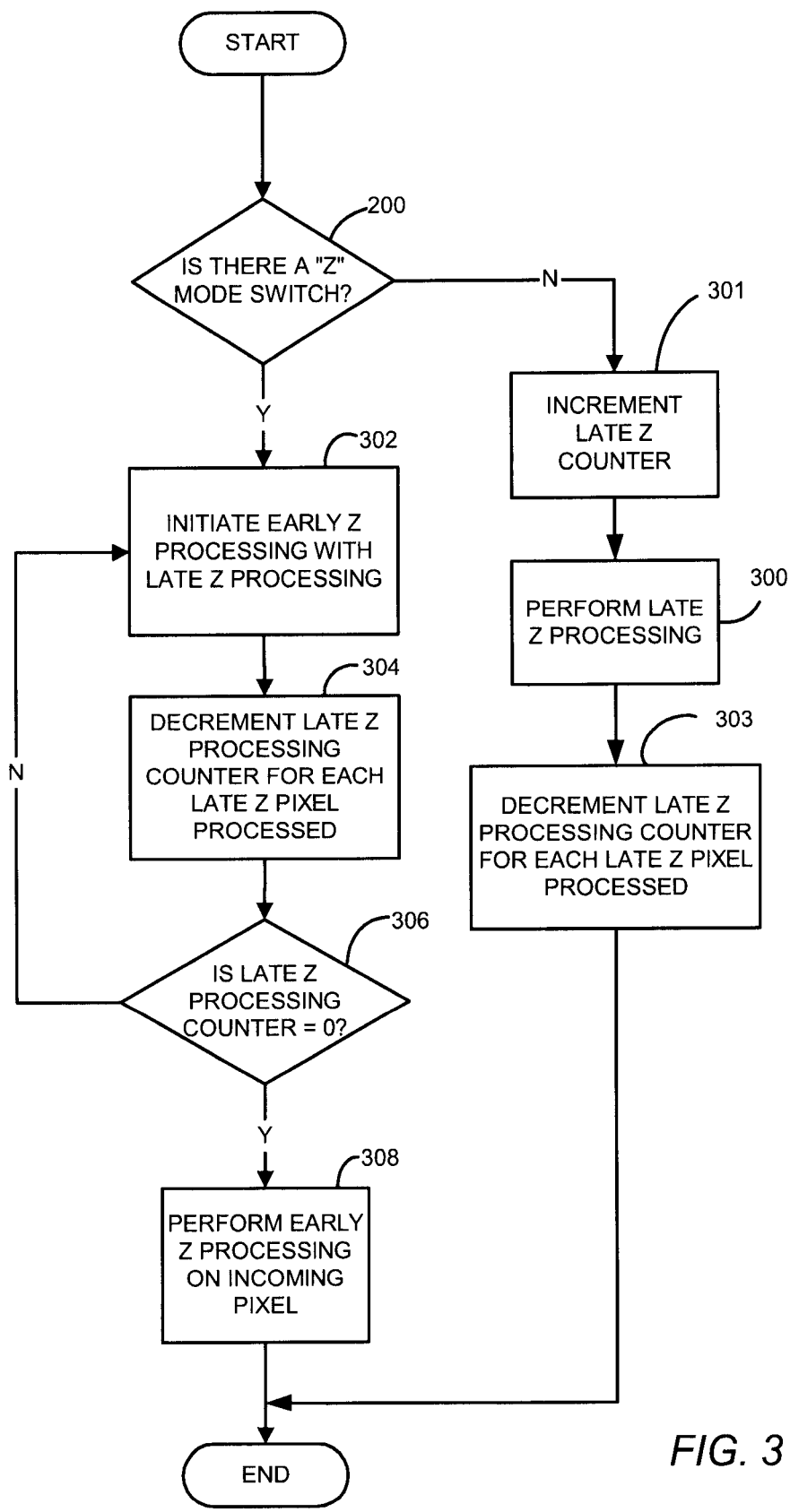
FIG. 3 illustrates a flow diagram of one example of a Z processing methodology according to the present disclosure.

FIG. 3 illustrates in more detail one example of a method for eliminating stalling of data in a pixel pipeline, due for example to a change in mode between early Z processing and late Z processing. Again, this method may be carried out by any suitable structure and in one example, may be carried out by the Z processing stage 108 with concurrent early Z and late Z processing and a coprocessor or any suitable structure. As shown in block 200, the method includes determining whether a mode of Z processing may be changed from late Z processing to early Z processing as discussed with reference to FIG. 2. If there is no mode switch, the processing continues as shown in block 301 by incrementing a late Z depth counter that has a value representing the number of late Z pixels in the pipeline. As shown in block 300, the method includes continuing to perform late Z processing on pixels in the pipeline. When the processing is complete, the counter is decremented as shown in block 303. The Z processing stage or the coprocessor may include the logic that updates the counter in response to a late Z pixel entering the pipeline and that determines whether an overlap of early Z and late Z pixels exists in the pipeline based on the counter value (if the counter is 0, then there are no 'late Z' pixels and hence no overlap.) Also if the counter is 0, then the Z logic can be switched out of 'concurrent' early Z/late Z mode. The Z depth counter is used by the logic to track completion of late Z processing of pixels in the pixel pipeline and to determine when no more late pixels are in the pipeline.

However, if a late Z processing to early Z processing mode switch condition is detected, as shown in block 302, the method includes initiating early Z processing concurrently with late Z processing, such as by the Z processing stage 108 with concurrent early Z and late Z processing. For example, if a late Z pixel is currently being processed in the pipeline, the Z processing stage 108 would also evaluate an early Z pixel from the scan converter using early Z processing. As shown in block 304, when this occurs, the late Z processing counter 109, controlled by the Z processing stage 108 in this example, is decremented each time a late Z pixel has been processed from the pipeline. This is done to keep track of the late Z pixels already in the pipeline. As shown in block 306, the method includes determining if all of the late Z pixels in the pipeline have been Z processed, such as by the counter equaling 0. If the counter does not equal 0, the method includes continuing to receive and processing early Z pixels in the pipeline. However, if the last late Z pixel has been processed in the pixel pipeline, the method includes performing early Z processing on the early Z pixels that have entered the pipeline as shown in block 308. As such, the method includes determining whether the late Z processing for one or more pixels currently in the pixel pipeline is completed and if so, solely performing early Z processing for subsequent pixels entering the pixel pipeline when the late Z processing has been completed for the pixels currently in the pixel pipeline. In contrast to known prior art techniques, instead of flushing the pipeline that was processing late Z pixels, when an early Z pixel needs to be processed, the above method instead allows the concurrent Z processing of both late Z pixels and early Z pixels and processing of corresponding pixels in the pipeline at different stages of the pipeline.

Figure 4:
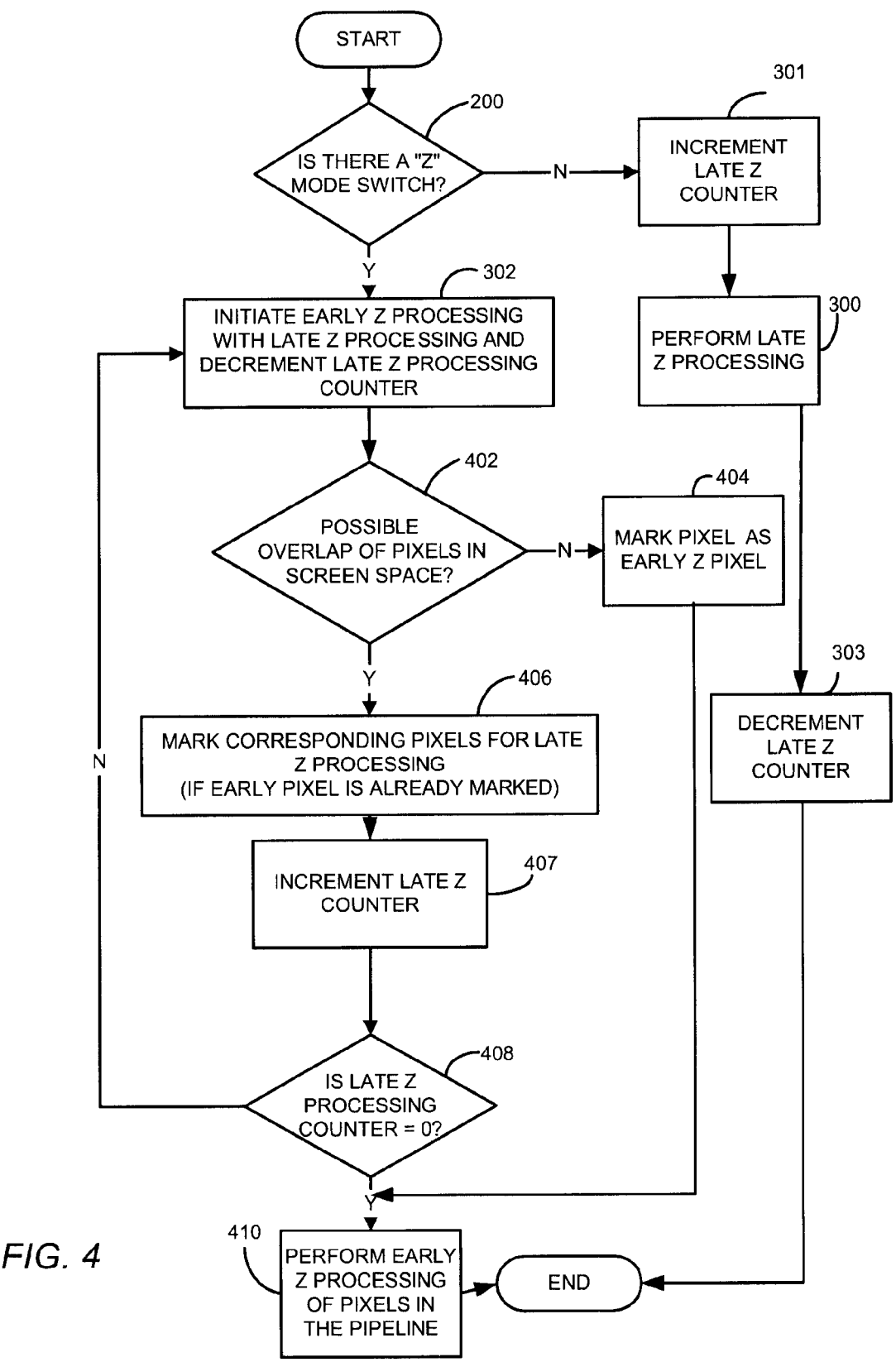
FIG. 4 shows a flow diagram illustrating an example of a Z processing methodology including determining and marking whether a pixel to be processed is to be early or late Z processed.

FIG. 4 illustrates a flow diagram illustrating another method for eliminating stalling of data in a pixel pipeline relating to pixels of an object or tile that may overlap in screen space. Typically all new pixels entering the pipeline are marked as early pixels unless an overlap in screen space is detected in which case the pixels are marked as late Z processed pixels. As shown, the method includes, after determining that there is a Z mode switch, initiating early Z processing concurrent with late Z processing in the Z processing stage 108. As shown in block 402, the method includes determining if there is possible overlap of early and late pixels in screen space. This entails determining whether there is an overlap in a destination region of, for example, a pixel in an object to determine whether the early Z pixel and late Z pixel map to the same screen coordinate. This may be done for example by the overlap detection logic or any suitable structure. If they do not overlap, as shown in block 404, the method includes marking the pixel as an early Z pixel. If, however, there is an overlap detected, the method includes marking the early Z pixel as a late Z pixel and incrementing the late Z counter, as shown in blocks 406 and 407. Marking may be done in any suitable manner and in this example includes setting a marking bit associated with the pixel to indicate that it undergoes late Z processing. As such, if an overlap is determined, the early Z pixel gets marked as a late Z pixel.

As late Z pixels are processed in the pixel pipeline, the counter is decremented so that when the counter reaches zero, the Z processing stage 108 can switch modes from a concurrent early and late Z processing mode to an early Z processing mode and overlap checking ceases. As shown in block 408, the method includes processing all pixels marked as late Z pixels in the pipeline and then performing early Z pixel processing on pixels entering the pipeline as early Z pixels in the pipeline if the counter is zero (meaning that there are no late Z pixels in the pixel pipeline that need to be processed). For example, the late Z counter is checked to determine whether all late Z pixels have been processed as shown in block 408. If so, then early Z processing is performed for pixels entering the pipeline. This is shown in block 410. The process then ends by continuing to process pixels as desired. Using the overlap detection allows even software applications that require strict ordering to operate correctly.

Among other advantages, the Z processing stage concurrently performs late Z processing for one or more pixels currently in pixel pipeline 104 and early Z processing for one or more pixels entering the pixel pipeline 104 to avoid flushing of the pixel pipeline. Other advantages will be recognized by those having ordinary skill in the art.

The above detailed description of the present examples has been presented for the purposes of illustration and description only and not by limitation. It is therefore contemplated that the present application cover any additional modifications, variations, or equivalents but fall within the spirit and scope of the basic underlying principles disclosed above and the appended claims.

What is claimed is:

1. A method for processing pixel depth information comprising:
determining, for a Z processing stage that switches between early and late Z processing for different pixels in a pipeline, whether or not a mode of Z processing should be changed from late Z to early Z; and if the mode should be changed, performing late Z processing for one or more pixels currently in the pixel pipeline and performing early Z processing for one or more pixels entering the pixel pipeline without flushing any of said pixels from the pixel pipeline.

2. The method of claim 1 comprising tracking completion of late Z processing of pixels in the pixel pipeline.

3. A method for processing pixel depth information comprising:
   determining, for a Z processing stage that switches between early and late Z processing for different pixels in a pipeline, whether or not the mode of Z processing should be changed within the Z processing stage associated with a pixel pipeline from late Z to early Z processing;
   if the mode should be changed, performing late Z processing for one or more pixels currently in the pixel pipeline and performing early Z processing for one or more pixels entering the pixel pipeline without flushing any of said pixels from the pixel pipeline;
   determining whether the late Z processing for the one or more pixels currently in the pixel pipeline has been completed; and
   solely performing early Z processing for subsequent pixels entering the pixel pipeline in response to determining that late Z processing for the one or more pixels currently in the pixel pipeline has been completed.

4. The method according to claim 3, wherein determining whether the late Z processing for the one or more pixels currently in the pixel pipeline has been completed comprises determining based on a late Z-depth counter being set to a value indicating completion of late Z processing for all pixels currently in the pixel pipeline.

5. The method according to claim 3, wherein the method further comprises:
   determining if there is possible overlap in screen space between at least one early Z pixel and at least one late Z pixel;
   if an overlap is determined, marking the early Z pixel as a late Z pixel; and
   performing late Z processing for one or more pixels currently in the pixel pipeline and performing early Z processing for one or more pixels entering the pixel pipeline without flushing any of said pixels from the pixel pipeline.

6. A method for processing pixel depth information comprising:
   determining, for a Z processing stage that switches between early and late Z processing for different pixels in a pipeline, whether a mode of Z processing should be changed within the Z processing stage of a pixel pipeline from late Z to early Z processing;
   if so, perform late Z processing for one or more late Z pixels currently in the pixel pipeline and early Z processing for one or more pixels entering the pixel pipeline;
   determining whether the late Z processing for the one or more pixels currently in the pixel pipeline has been completed; and
   if so, solely performing early Z processing for subsequent pixels entering the pixel pipeline responsive to determining that late Z processing for the one or more pixels currently in the pixel pipeline has been completed.

7. The method according to claim 6, wherein determining whether the late Z processing for the one or more pixels currently in the pixel pipeline has been completed comprises determining one of a late Z-depth counter being decremented to zero.

8. The method according to claim 6, wherein the method further comprises:
   determining if there is possible overlap in screen space between at least one early Z pixel and at least one late Z pixel;
   if an overlap is determined, marking the early Z pixel as a late Z pixel; and
   performing late Z processing for one or more pixels currently in the pixel pipeline and performing early Z processing for one or more pixels entering the pixel pipeline without flushing any of said pixels from the pixel pipeline.

9. An apparatus for processing pixel depth information comprising:
   a Z processing stage configured to:
      perform both late Z processing for one or more pixels currently in a pixel pipeline and performing early Z processing for one or more pixels entering the pixel pipeline without flushing any of said pixels from the pixel pipeline;
      determine whether the late Z processing for the one or more pixels currently in the pixel pipeline has been completed; and
      solely perform early Z processing for subsequent pixels entering the pixel pipeline responsive to determining that late Z processing for the one or more pixels currently in the pixel pipeline has been completed.

10. The apparatus according to claim 9, wherein the Z processing stage further comprises a counter configured to be updated in response to completion of late Z processing of pixels in the pixel pipeline.

11. The apparatus according to claim 9, including logic operative to:
   determine if there is possible overlap in screen space between at least one early Z pixel and at least one late Z pixel;
   if an overlap is determined, mark the early Z pixel as a late Z pixel; and
   performing late Z processing for one or more pixels currently in the pixel pipeline and performing early Z processing for one or more pixels entering the pixel pipeline without flushing any of said pixels from the pixel pipeline.

12. An apparatus for processing pixel depth information comprising:
   pixel processing pipeline logic having pixel processing rendering states associated therewith and operative to provide information indicating that a pixel from the pipeline is valid for late Z processing;
   a Z processing stage, configured to:
      perform both late Z processing for one or more pixels currently in the pixel pipeline and early Z processing for one or more pixels entering the pixel pipeline without flushing any of said pixels from the pipeline if it is determined that a mode of Z processing may be changed within the Z processing stage associated with the pixel pipeline from late Z to early Z processing;
      determine whether the late Z processing for the one or more pixels currently in the pixel pipeline has been completed; and
      solely perform early Z processing for subsequent pixels entering the pixel pipeline responsive to determining that late Z processing for the one or more pixels currently in the pixel pipeline has been completed.

13. The apparatus according to claim 12, wherein the Z processing stage further comprises a counter configured to be updated in response to completion of late Z processing of pixels in the pixel pipeline.

14. The apparatus according to claim 12, including a scan converter operatively coupled to the Z processing stage and operative to:
- determine if there is possible overlap in screen space between at least one early Z pixel and at least one late Z pixel;
- if an overlap is determined, mark the early Z pixel as a late Z pixel; and
- wherein the Z processing stage is operative to perform late Z processing for one or more pixels currently in the pixel pipeline and performing early Z processing for one or more pixels entering the pixel pipeline without flushing any of said pixels from the pixel pipeline.

15. The apparatus according to claim 14, further comprising a counter configured to be updated in response to completion of late Z processing of pixels in the pixel pipeline.

16. The apparatus of claim 12 comprising a Z buffer operatively coupled to the Z processing stage that stores Z values determined by the Z processing stage.

17. The apparatus of claim 14 comprising logic operative to update the counter in response to a late Z pixel entering the pipeline and operative to determine whether an overlap of early Z and late Z pixels exists in the pipeline and operative to switch a mode of the Z processing logic in response a count value of the counter.

* * * * *